(12) United States Patent
Abineri et al.

(10) Patent No.: US 7,308,454 B2
(45) Date of Patent: Dec. 11, 2007

(54) DATA INTEGRATION

(75) Inventors: Robert F Abineri, Cambridge (GB);
Maatthew Jackson, Stoke-On-Trent
(GB); Terry Shackle, Ipswich (GB)

(73) Assignee: British Telecommunications public limited company, London (GB)

( * ) Notice: Subject to any disclaimer, the term of this patent is extended or adjusted under 35 U.S.C. 154(b) by 53 days.

(21) Appl. No.: 10/494,941

(22) PCT Filed: Nov. 11, 2002

(86) PCT No.: PCT/GB02/05088

§ 371 (c)(1),
(2), (4) Date: May 7, 2004

(87) PCT Pub. No.: WO03/041340

PCT Pub. Date: May 15, 2003

(65) Prior Publication Data

US 2005/0015397 A1    Jan. 20, 2005

(30) Foreign Application Priority Data

Nov. 9, 2001    (EP)    ................................. 01309482

(51) Int. Cl.
*G06F 17/30* (2006.01)
*G06F 7/00* (2006.01)
(52) U.S. Cl. ........................................ 707/101; 707/100
(58) Field of Classification Search ........ 707/100–102, 707/1
See application file for complete search history.

(56) References Cited

U.S. PATENT DOCUMENTS

| | | | |
|---|---|---|---|
| 5,285,494 A | 2/1994 | Sprecher et al. ............ 455/423 |
| 5,291,583 A | 3/1994 | Bapat ........................ 717/137 |
| 5,680,325 A | 10/1997 | Rohner ...................... 709/220 |
| 5,761,432 A | 6/1998 | Bergholm et al. .......... 709/226 |
| 5,774,689 A | 6/1998 | Curtis et al. ................. 703/21 |
| 5,838,965 A * | 11/1998 | Kavanagh et al. ...... 707/103 R |
| 5,913,037 A * | 6/1999 | Spofford et al. ............ 709/226 |
| 6,101,500 A * | 8/2000 | Lau ........................ 707/103 R |
| 6,216,134 B1 | 4/2001 | Heckerman ............... 707/104.1 |
| 6,374,253 B1 * | 4/2002 | Weider et al. .............. 707/102 |
| 6,381,605 B1 * | 4/2002 | Kothuri et al. ............. 707/100 |
| 6,938,046 B2 * | 8/2005 | Cooke et al. ............... 707/101 |
| 6,968,336 B1 * | 11/2005 | Gupta ........................ 707/100 |

FOREIGN PATENT DOCUMENTS

WO    WO 99/33002    7/1999

OTHER PUBLICATIONS

John A et al, "A java-based SMP agent for dynamic MIBS", Global Telecommunications Conference, 1999, IEEE.

(Continued)

*Primary Examiner*—Sam Rimell
*Assistant Examiner*—Phuong-Thao Cao
(74) *Attorney, Agent, or Firm*—Nixon & Vanderhye P.C.

(57) ABSTRACT

An inventory management system includes a database for storing object oriented network inventory data. Data on network components is input into the database as different selected classes of objects. An object identifier is selectively added dependent on the class of object. At least one class of objects can accommodate other objects such that is stored as a modified object tree without all objects contributing to the object identifier.

8 Claims, 14 Drawing Sheets

OTHER PUBLICATIONS

John et al., "A java-based SMP Agent for Dynamic MIBS", Global Telecommunications Conference, 1999, IEEE.

International Search Report—Jan. 30, 2003.

Lyons, "Converting Flat File Content into XML and Vice-Versa", pp. 1-11, Dec. 1999.

HPRE Space Info Management Standards, "Space Information Management Standards", Jun. 4, 1999, pp. 1-7.

Network Inventory Management—Prduct Brief, Nortel Networks 2000.

Herdlein, "Working from the Inside Out", TELEPHONY, Oct. 9, 2000.

Network Inventory: A Critical Piece to Solving the Elusive Flow-through Provisioning Problem, Boldtech Systems 2001.

Ipitek Node Wizard® Network Management System—2002.

Yamamuro et al., "Strategic Network Resource Inventory Management", Proceedings of the Network Oeprations and Management Symposium (NOMS), Kissimmee, Feb. 14-17, 1994, New York, IEEE US-ISBN0-7803-1812-9, vol. 2 SYMP.4, pp. 508-518.

Suzuki, "Information Engineering Architecture for Strategic Network Operations and Management Platforms", Proceedings of the Network Operations and Management Symposium (NOMS), Kissimmee, Feb. 14-17, 1994, New York, IEEE, US 0-7083-1812-9, vol. 2 SYMP. 4, pp. 268-277.

International Search Report—Dec. 17, 2002.

Vandenberg, "MIB II Extends SNMP Interoperability Vendors are Adding Priorietary Extensions to SNMP's Management Information Base, Compromising the Standard, MIB II Can Change That", Data Communications, McGraw Hill, New York, US, vol. 19, No. 13, Oct. 1990, pp. 97-98, 100, 102.

* cited by examiner

Network

Types Available by Class

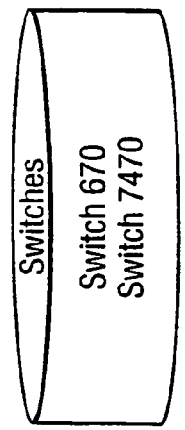
Switches
Switch 670
Switch 7470

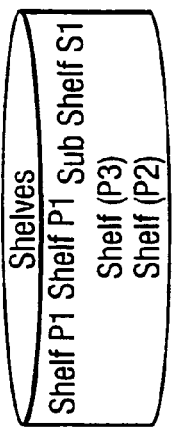
Shelves
Shelf P1 Shelf P1 Sub Shelf S1
Shelf (P3)
Shelf (P2)

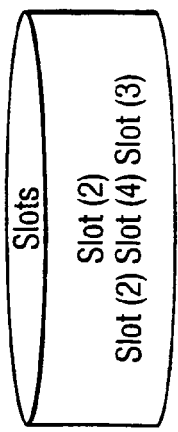
Slots
Slot (2)
Slot (2) Slot (4) Slot (3)

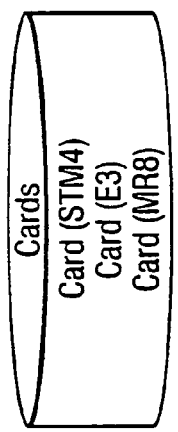
Cards
Card (STM4)
Card (E3)
Card (MR8)

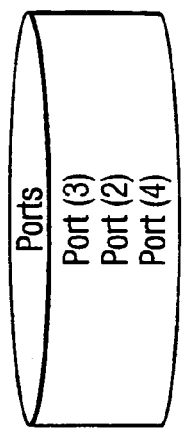
Ports
Port (3)
Port (2)
Port (4)

| | | | | | |
|---|---|---|---|---|---|
| Case 1 | Shelf (P1) | Slot 1 | Port (1) Port (2) Port (3) Port (4) | — | — |
| Case 2 | Shelf (P2) | Slot (2) Card (E3) | Port (1) | 1 | — |
| Switch 7470 Case 1 | Shelf (P1) | Slot (3) Card (STM1) | Slot 1 Slot (FX) Card (FIC) | | |
| | Shelf (P2) | Slot (4) | Slot 1 | | |
| Switch 7470 Case 2 | Shelf (P1) | Sub Shelf S2 | Slot (2) | | |
| | Shelf (P2) | Sub Shelf S1 | Slot 1 Card (STM4) | | |
| | | Sub Shelf S2 | Slot (2) | | |

Fig. 5.

| Range | Current Value | Threshold | Scale | Result | Display |
|---|---|---|---|---|---|
| 63 | 35 | 50 | 10 | 5 | |
| 10 | 7.2 | 7 | 10 | 7 | Alarm |
| 6000 | 1 | 5000 | 10 | 0 | |
| 6 | 4 | 6 | 15 | 10 | |
| 916 | 707 | 706 | 10 | 7 | No Alarm |

FPID (Full PID) Shows the current location → MSIP-Coventry-Coventry01-P3-2

This represents the card that is currently or allocated for this slot → Card / P3-2 / E3/3Port

Shows if the port or card is faulty → F I columns

Navigation between slots and half shelves. Not always the same as the navigation is of the current level or level above in the tree → Shelf / H/Shelf / Slot navigation arrows, Accept / Cancel

Allocation Expiry date automatically set to three months from the date of allocation but may be changed in this view → Expires column

Shows if the port is reserved → Reserved column

DDF OFF Picked from list supplied at a site level → DDF/OFF column

Allocation notes may be entered at this point → Alloc Notes column

Allocation reference generated automatically → Alloc Ref column

| PID | Slot Notes | | | | | | |
|---|---|---|---|---|---|---|---|
| P3-2 | E3/3Port | | Reserved | F I Previous | | | |
| | | | | y Next | | | |

| PID | Alloc Ref | Alloc Notes | PSID | DDF/OFF | Reserved | F I | Expires | PSID Notes |
|---|---|---|---|---|---|---|---|---|
| P3-2-1 | 01432/peterfd/12-04-01 | Grimleys Bank Plc | FXOD012311F3 S306 R60 V2 AE2 | | Y | | | Grimleys Bank PLC |
| P3-2-2 | 01521/petefd/11-05-01 | Holiday Travel | | F3 S306 R60 V2 AE3 | | | | |
| P3-2-3 | | | | F3 S306 R60 V2 AE4 | APE MNT | | 11-0801 | |

DATA INTEGRATION

This application is the U.S. national phase of international application PCT/GB02/105088 filed 11 Nov. 2002 which designated the U.S. and claims benefit of EP 01309482.6, dated 9 Nov. 2001, the entire content of which is hereby incorporated by reference.

BACKGROUND

1. Technical Field

The invention relates to the integration of data from different sources. It has particular utility in relation to the integration of data to form inventory databases, especially those of telecommunication network operators.

2. Related Art

Some collections of data are easily organised in accordance with a hierarchy. This provides a useful method for indexing items of data contained within the collection. For example, a collection of data relating to real estate might be organised into a hierarchy in which buildings are considered to contain one or more floors, each of which, in turn, contains one or more rooms. Similarly, collections of financial data might be organised into years which contain half-years, which contain quarters which contain months. The hierarchy might also reflect an accommodation relationship between levels in the hierarchy—for example a slot in a telecommunications switch might be considered to accommodate a line card.

A problem arises, however, when it is required to integrate data from different sources which are not organised in accordance with the same view of the hierarchy.

BRIEF SUMMARY

According to a first aspect of the present invention, there is provided a method of integrating collections of data items into a hierarchically indexed database, said method comprising:

storing data listing a set of generic level indices to be included in a generic hierarchical index;
 receiving a collection of data items, each data item including a hierarchical index comprising a set of component level indices, the value of each component level index relating to one of a set of levels which form a first subset of said generic set of levels;
 inserting values for one or more intermediate indices present in said generic hierarchical index between the values of at least two component indices to generate a generic hierarchical index; and
 associating said data item with the generic hierarchical index so generated.

By storing a template for a generic hierarchical index which includes levels corresponding to levels found in a specific hierarchical index encoded in input data, and finding values for level indices for the levels present in the generic hierarchical index but absent from the specific hierarchical index, a generic hierarchical index is generated for association with the input data item. This can be done for collections of data items even where those collections are arranged in accordance with different specific hierarchical indices.

Preferably, said inserting step comprises storing conversion data associating one or more values of a component level index with a value of one or more of said intermediate indices above said component level in said generic hierarchy.

This provides a simple method of generating the required intermediate indices. A different set of conversion data can be supplied for each collection of data items having a specific hierarchy.

In preferred embodiments, the conversion data is itself stored in the form of a hierarchy.

According to a second aspect of the present invention, there is provided a communications network comprising:

a first element manager arranged in operation to output a first file comprising records labelled in accordance with a first hierarchical indexing scheme;
 a second element manager arranged in operation to output a second file representing comprising records labelled in accordance with a second hierarchical indexing scheme, said second hierarchical indexing scheme sharing at least one level with said first hierarchical indexing scheme;
 a computer storing a network inventory database;
 means providing communication between each of said element managers and said computer;
 software stored on said computer executable to:
 receive said first file from said first element manager and expand said first hierarchical index to an index formed in accordance with a generic hierarchical index;
 associate each record in said first file with a generic hierarchical index so derived;
 receive said second file from said second element manager and expand said second hierarchical index to an index formed in accordance with said generic hierarchical index; and
 associate each record in said second file with a generic hierarchical index so derived.

According to a third aspect of the present invention there is provided a method of indexing a non-object oriented file to an object oriented database including: assigning attributes of the classification object which affect their behaviour in relationship to an object tree and an object identifier to allow the objects to be stored on the database in the form of an object oriented database, whereby the data is stored in a modified object tree form to allow the indexing of the non-object oriented file therein.

Further according to a fourth aspect of the invention there is provided a method of constructing an object oriented database including providing a first object identifier to allow referencing up or down an object tree, and providing a second object identifier to allow parallel referencing from the object tree to provide a further virtual dimension to the database tree.

Further according to a fifth aspect of the invention there is provided a method of providing a database on a storage medium for a network management system comprising: assigning attributes to components as objects which affect their behaviour in relationship to an object tree and an object identifier to allow the objects to be stored on the storage medium in the form of an object oriented database whereby the data is stored in a modified object tree form to allow the indexing of a non-object oriented file thereon.

Preferably the method steps include selectively assigning a plurality of classes of object to the components, selectively determining whether component information is added to the object identifier dependent on the selected class of object, selectively editing the object identifier dependent on the class of object assigned, and selectively allowing object classes to accommodate other objects, whereby the data is stored in a modified object tree form without all objects contributing to the object identifier.

Further according to a sixth aspect of the invention there is provided a network database system including first database storage means for storing object oriented network inventory data input means for inputting data relating to network components into the database as different selected classes of objects and for adding to the object identifier dependent on the class of object selected, means for selectively allowing object classes to accommodate other objects, and control means for controlling the stored data into a form defining a modified object tree without all objects contributing to the object identifier.

BRIEF SUMMARY OF THE DRAWINGS

The invention will now be described by way of example with reference to the accompanying drawings in which:

FIG. 5 shows equipment modeling on associated classes;

FIG. 11 shows a screen view associated with the search facility;

FIG. 12 shows a screen view associated with selection or a slot or port record.

DETAILED DESCRIPTION OF EXEMPLARY EMBODIMENTS

Figure 1:
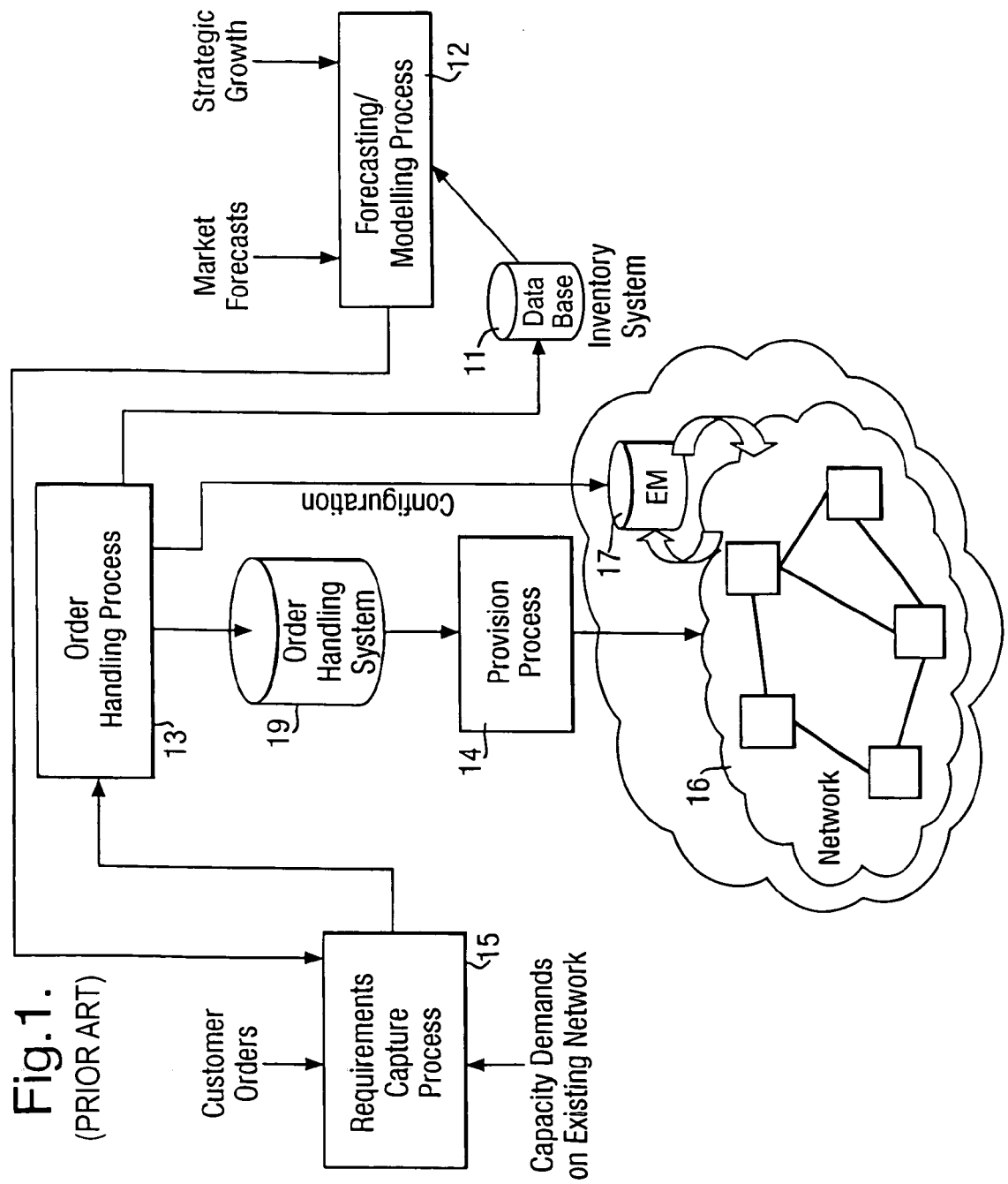
FIG. 1 shows a known example of an inventory system incorporated into a network management system.

A known basic network management system is shown in FIG. 1 and includes a network inventory database 11, a network forecasting or modeling tool 12 and an order handling arrangement including a handling processor 13 and a handling system 19 with its own data storage. Provisioning 14 is provided following orders raised by handling system 19. Additional network requirements are input to the provisioning system from requirements block 15 providing requirements capture.

The network 16 will have been constructed based on a vendor's configuration, information thereon being held within an element manager block 17 including structure and traffic information. This can be made available to the inventory system.

The inventory database 11 holds information on the existing network 16, which information will have been entered previously, typically manually. The stored information will relate to network sites, switches and shelves, slots or cards relating to those switches as well as port information.

The network forecasting or modeling tool 12 accesses the data stored in the inventory 11 to allow modeling of the network to be achieved also taking into account market forecasts and strategic growth. The inventory database 11 will also contain information on what physical components of the network are being utilised and this allows the modeling tool to provide an output (e.g. in spreadsheet form) of areas which may have spare capacity.

When new equipment or other provisioning is required these are passed to the provisioning system 14 from requirements process block 15 via order handling process 13 and system 19. New equipment is ordered by manual selection of the appropriate network availability (having considered the availability determined from the output of forecasting system 12).

With such a system, whilst it provides basic network management, it is built around a single vendor's equipment only. Further the inventory data will typically be incomplete and inaccurate due to errors in tying the element manager information to that held in the inventory, to planned changes not yet held in the inventory and inventory data being insufficiently detailed to identify easily and accurately where any spare capacity resides. It has been estimated that the inventory database in such systems can vary from an actual network situation by as much as 50% so leading to inefficient utilisation of the network, with the associated costs involved.

Thus, the FIG. 1 arrangement, whilst providing a basic network management approach, is inflexible, because the inventory database will have been built to accommodate a single vendor's equipment only. In addition, in such a system the file listing would not identify where in a particular switch, for example, the spare capacity was located. The planner therefore would need to take the information and investigate in more detail what allocation ports were appropriate. Further the planner would need to review switch location positions in the network to ensure traffic requirements were not exceeded for switches or ports on the switches, which switches would typically have to cope with a mixture of network to network interface (NNI) traffic and user to network interface (UNI) traffic.

Still further, as the inventory database is tied to one vendor's equipment, use of another vendor's products will require reworking of the whole database, as the identification tags to identify switch type and other criteria, such as number of slots or card types, will be different and not easily accommodated.

Figure 2:
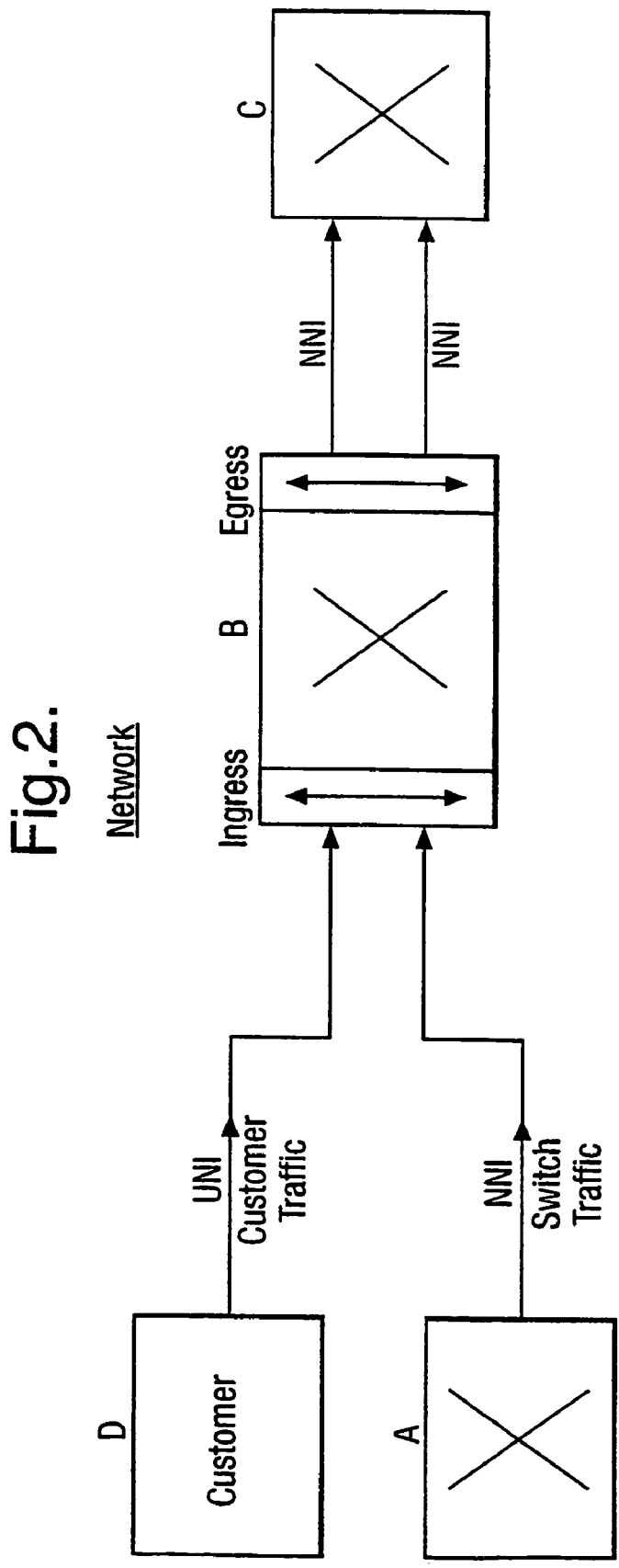
FIG. 2 shows part of the network with customer and switch traffic.

In FIG. 2, a portion of a typical network is shown. The network includes a number of switches A, B, C connected as shown. A customer D has access to the network via switch B. This user traffic or (UNI) ingress has to be accommodated as well as switch traffic (NNI) ingress. The switch B output is entirely NNI traffic to switch C. Hence the egress will be entirely NNI. Therefore, dependent on the position in the network, the database is arranged to incorporate presets on the UNI to NNI ratio, with a default typically 50% and with a traffic maximum (switch fill) preset typically 80%.

Figure 3B:
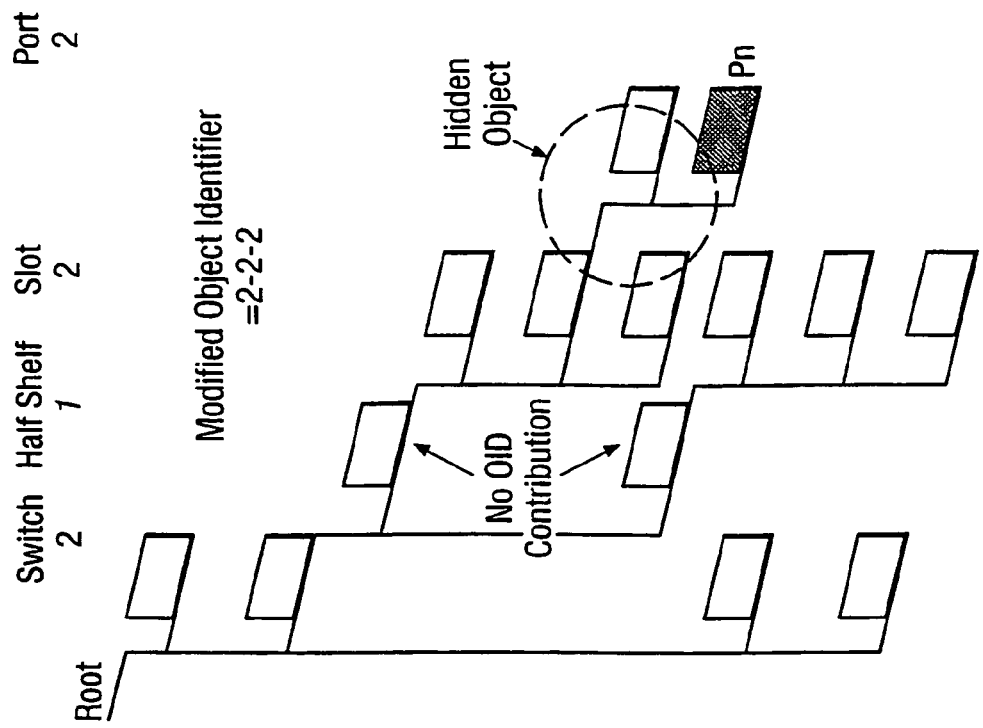
FIGS. 3A and 3B shows network components represented in an object tree.
Figure 3A:
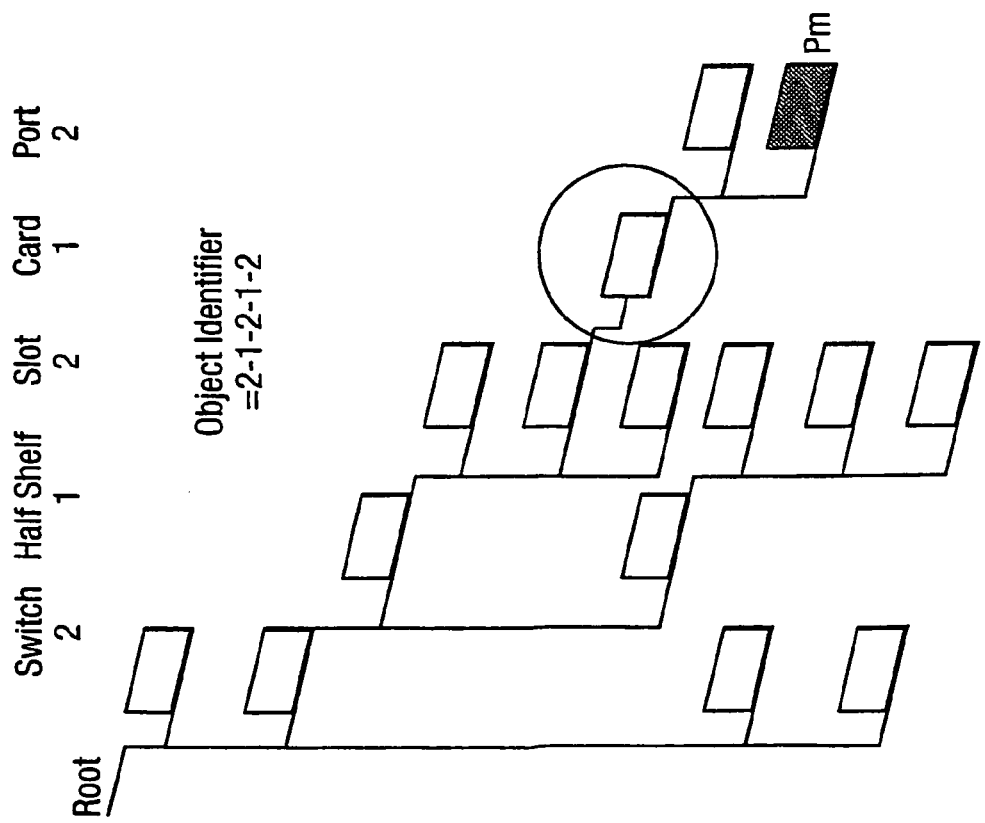

Switches, for example will be structured to include shelves, cards and ports and the layers can be represented by the tree structure of FIG. 3A. However, not all switches are constructed identically and, as shown, can include sub-shelves for example which can give rise to errors in the correct identification of ports within the structure when trying to construct a hierarchically indexed database.

It is to be understood that 'object' as used in this specification is not to be equated with the use of that term in object-oriented programming viz. a user defined type which has both state variables and methods executable to interact with those state variables. Rather, it is used herein either in its normal sense or in the sense of information object as defined in ITU-T's Recommendation X.208 entitled 'Specification of Abstract Syntax Notation One'. Such information objects may be considered to provide a node in an object tree. The above ITU-T Recommendation states:

'The semantics of an object identifier value are defined by reference to an object identifier tree . . . . Each arc of the tree is labelled by an object identifier component which is a numeric value. Each information object to be identified is allocated precisely one vertex (normally a leaf), and no other information object (of the same or a different type) is allocated to that same vertex. Thus an information object is uniquely and unambiguously identified by the sequence of numeric values (object identifier components) labelling the arcs in a path from the root to the vertex.'

Such an 'object identifier tree', is an example of a hierarchical index. The sequence of numeric values are an example of a sequence of values of level indices forming a hierarchical index.

Hence, in accordance with an exemplary generic hierarchical indexing scheme, port Pm in FIG. 3A will have the object identifier 21212 as its path from the root in FIG. 3A. This object identifier is constructed from five values of level indices—the value 2 at the switch level, 1 at the shelf level, 2 at the slot level, 1 at the card level, and 2 at the port level.

However, in accordance with a specific hierarchical indexing scheme, an alternative object identifier for port Pm is 222—as its path from the root is shelf 2, slot 2, port 2 (see FIG. 3B).

Figure 4A:
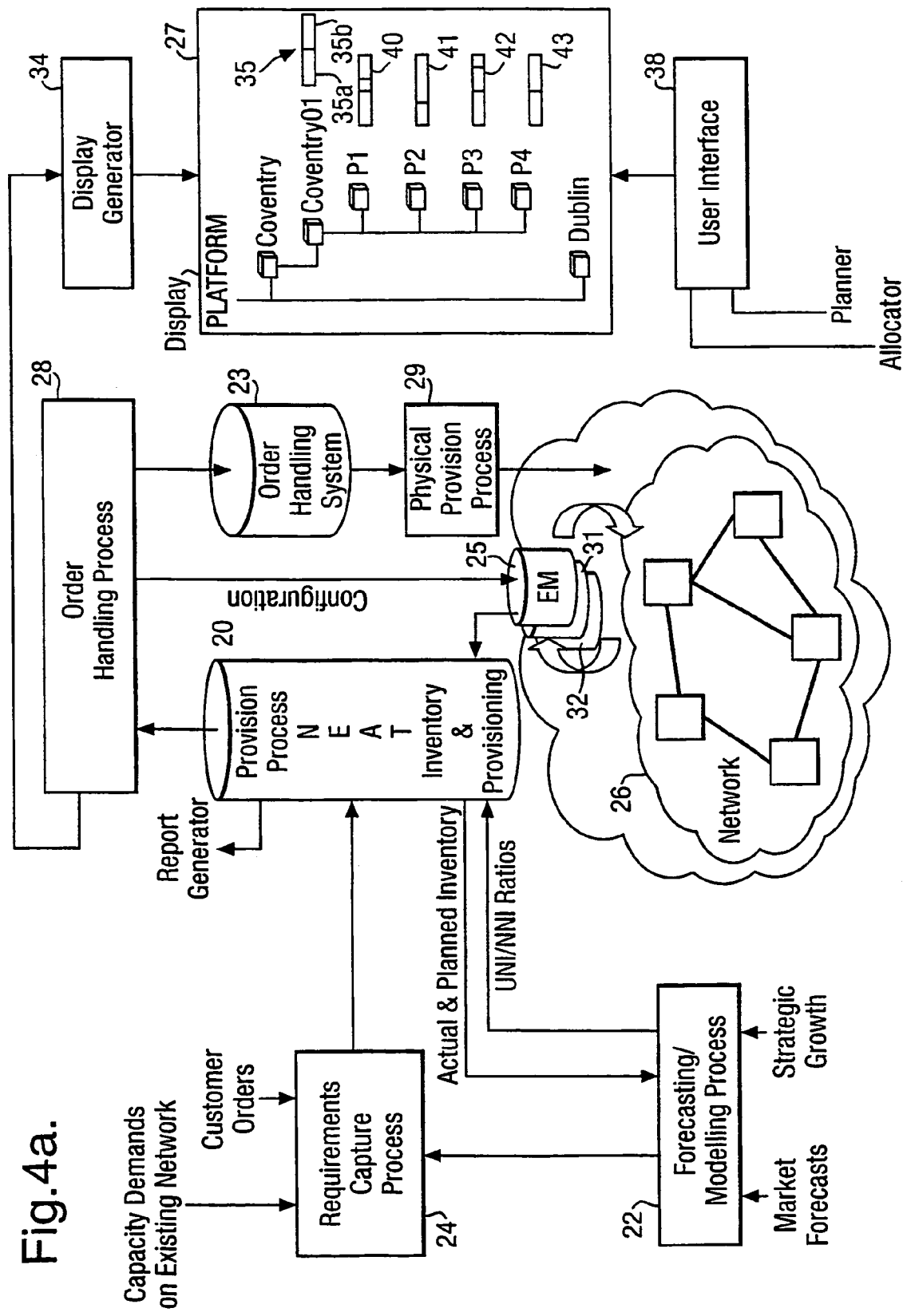
FIG. 4A shows an enhanced network inventory and planning system incorporating a hierarchical inventory database with associated devices including a display.

The alternative identifier, in combination with the switch name (i.e. Coventry) nevertheless forms a unique key and might be found as part of a record in a flat file output by one of element managers 25, 31, 32 shown in FIG. 4.

In accordance with the specific hierarchical indexing scheme used in FIG. 3B, the card at 2121 (according to the exemplary generic indexing scheme followed in the FIG. 3A view) is associated with slot which contains it so that the object (card) is 'hidden' by the use of the specific hierarchical index. In addition, the half shelf at 21 (according to the exemplary generic index) does not contribute to the object identifier constructed in accordance with the specific hierarchical indexing scheme leaving a modified object identifier (specific hierarchical index) of 222.

Hence in this example a first object identifier is 21212 and a second object identifier is 222. If desired, more than two object identifiers can be utilised to enable multiple index references to be provided.

This mechanism allows us to incorporate the vendor's index as we build the tree and so avoids the need for a separate object identifier and vendor identifier scheme. This also allows a new vendor's equipment to be added to the inventory system by building that vendor's identifiers into an object identifier constructed in accordance with a generic hierarchical indexing scheme.

As shown in FIG. 4, the system including the network equipment allocation tool (NEAT) which employs inventory database 20 for network 26 is built with data received from the vendor's data available from the element manager 25 by processing object identifiers constructed in accordance with a vendor's specific hierarchical indexing scheme to generate object identifiers constructed with a generic hierarchical indexing scheme. Other defining data is provided from forecasting/modeling process block 22 to preset UNI/NNI levels and other site information such as switch fill maxima.

The database 20 is now arranged such that the requirements processor 24 is intrinsically linked to the database so that actual inventory data in database 20 is also updated with planned inventory data, even before the additional utilisation is installed, so that the database 20 provides a more current appraisal of the network utilisation than heretofore due to the presence of inventory portions associated with currently provisioned network facilities and with planned network facilities. This in turn allows the forecasting device 22 to provide a more accurate model of network structure and utilisation as it receives actual and planned inventory data from database 20. By providing a single data source for both planned and in use network resources, any planner with access to the system will have all requisite information for further planning.

The inventory 20 now provides network information to the order handling processor 28 to ensure accurate provisioning so as to drive the order handling system 23. This provisioning process utilising the inventory 20 as an output to the order handling process maintains accurate operation and the order handling output from system 19 allows physical provision implementation.

The system can cope with more than one vendor's equipment and element managers 31, 32 also provide information on the network for receipt by the database 20.

A unique display 27 allows utilisation and network structure information held in database 20 to be displayed via generator 34. In the example shown the site information (i.e. Coventry) is represented in tree form to illustrate switch 1 with shelves P1 to P4. The linear indicia bar type display 35 with portions 35a, 35b is configurable to represent capacities (e.g. ingress/egress) and their utilisation on the network. Its generation is described with reference to FIG. 8 below. The darker the shade of the display, the greater the amount of egress already utilised relative to the preset value. If a colour display is provided the linear indicia of the display could change from green to red with intermediate colours when some way beyond minimum towards the maximum. The displays 40 to 43 show availability on shelves P1 to P4 respectively.

Figure 9:
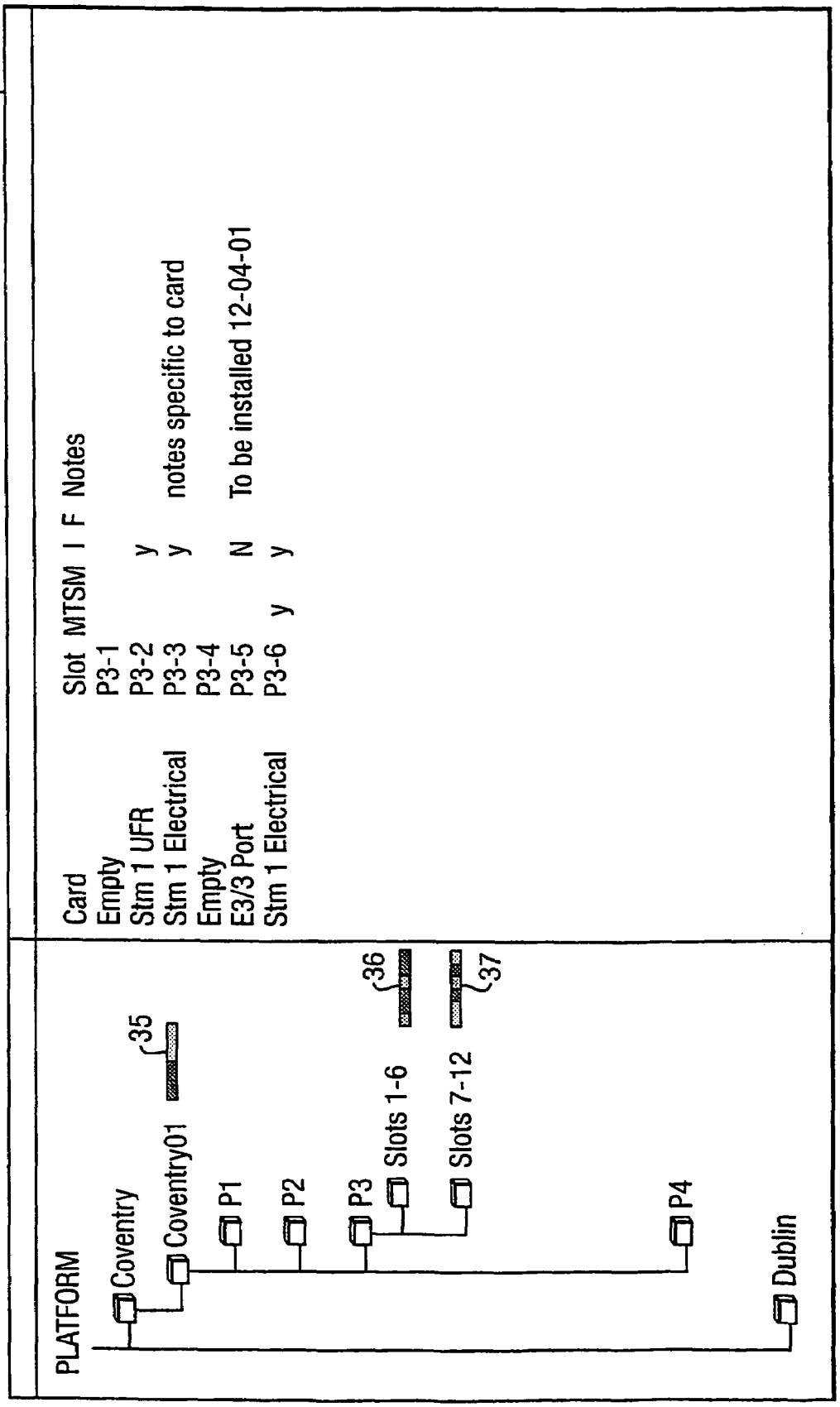
FIG. 9 shows both a tree view and a list view displayed simultaneously.

In a similar manner FIG. 9 shows the tree view together with the bar display 36 associated with slots 1-6 and display 37 for slots 7-12 on shelf P3 to indicate how many slots are populated. This is an important tool, allowing answers to capacity to be visually provided in a form understandable to non-specialist users and allow a planner to quickly identify a suitable location for a new link. The report generator 30 produces further information such as trend analysis, platform health, planning rule observance and planning listings.

A user interface 38 which may be web-based allows access to planners and allocation administrators with appropriate security mechanisms in place.

To build the database for network inventory or to add to the database will require various steps dependent on the equipment descriptions to be used. So starting with initiating equipment, the steps required are as follows:
1. Define sites
2. Define equipment classes
3. Define equipment types (based on classes)
4. Define specific equipment (based on types).

Figure 4B:
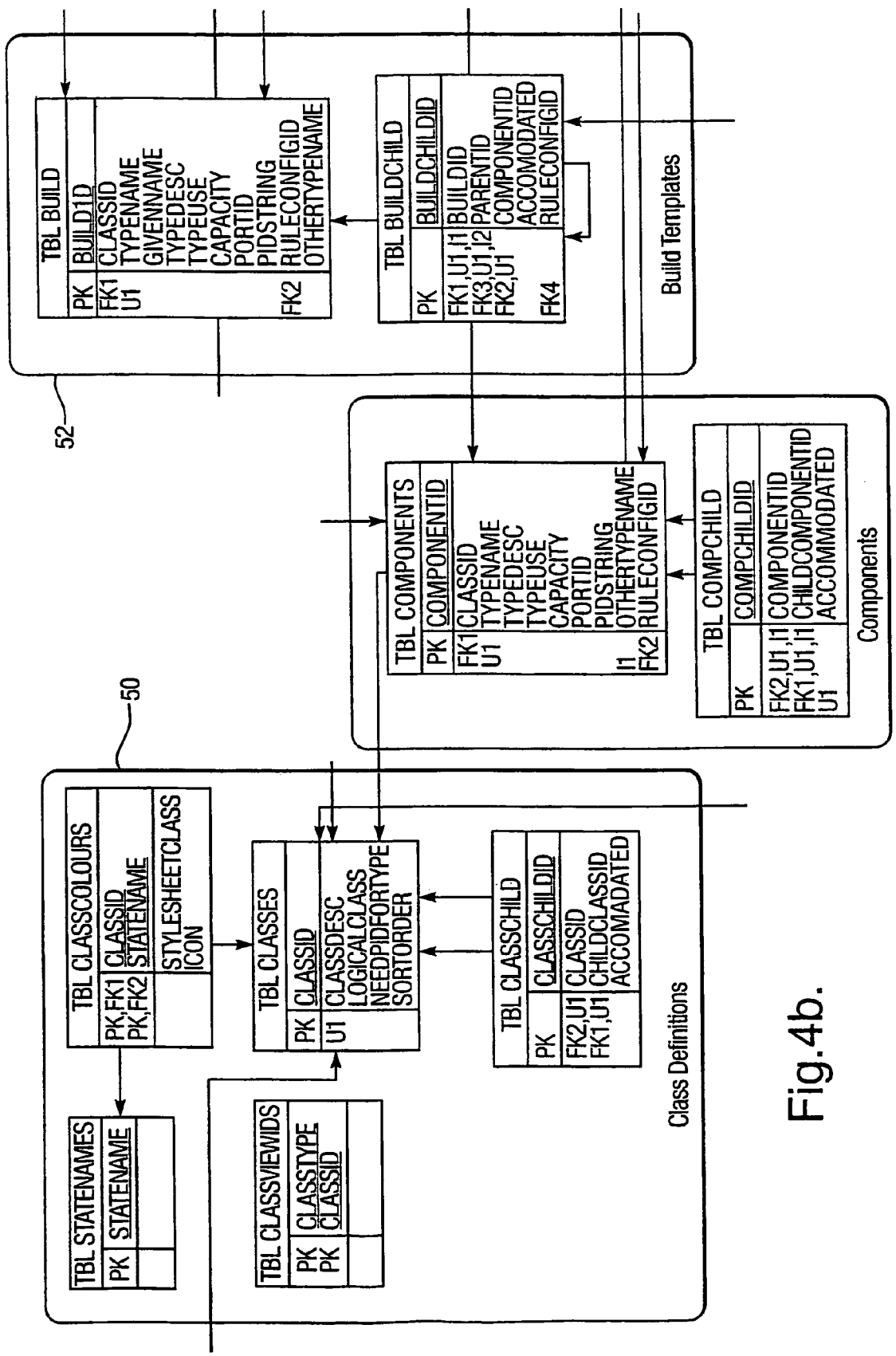
FIG. 4B shows a fragment of the design of the hierarchical inventory database.
Figure 6:
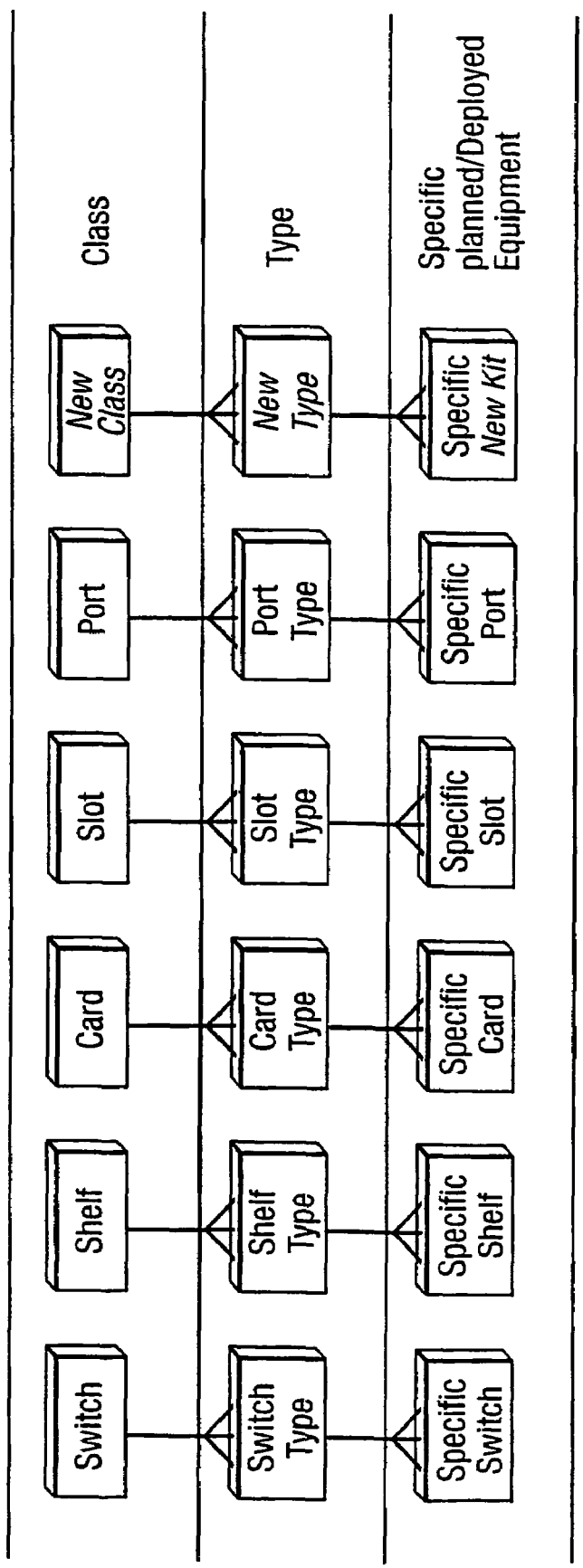
FIG. 6 illustrates component class types.

FIG. 4B shows a fragment of a design for a relational database used in an embodiment of the present invention.

The group of tables 50 labelled 'Class Definitions' contains tables which store data representing the generic indexing scheme used by the relational database. These tables indicate the inter-relationships between a plurality of classes (for example the inter-relationships between switches, shelves, half-shelves, slots, cards and ports). They include an indication that a switch can 'parent' a shelf which can parent half-shelves and so on. The 'NEEDPIDFORTYPE' value (discussed below) is given for each class.

The group of tables 52 labelled 'Build Templates' contains tables relating to the switches represented by specific element managers 25, 31, 32. These tables might, for example, indicate that a Alcatel 7470 switch has 3 shelves, each of which carries 12 slots, each of which might carry a card of type X, Y or Z, card X having ports A,B and C and so forth.

When the user is prompted to enter the information stored in the 'Build Templates', he is required to indicate for some classes, the contribution to a Port Identifier used in the flat files output by the relevant element manager. If, for example, the Class Definitions tables 50 indicate that a level index for each of the classes shelf, slot and port is required, then the 'Build Templates' must indicate the contribution to the Port Identifier corresponding to each of those classes. For example, the above-described Build Template for an Alcatel 7470 switch, a user might specify that the second shelf down on the switch would add the string '-2' to the port identifier, the third slot on the second shelf down would add the string '-3' to the port identifier, and that the first port on an E3/3 card which might be placed in that slot would add '-1' to the port identifier. It is the setting of the NEEDPIDFORTYPE flag in the Class Definitions table which results in the user being required to provide such information in the Build Template.

As mentioned above, an object identifier is a value which represents a unique position in a tree derived from the node positions at each level of the tree. In the present arrangement, however, objects are assigned to a class which cause a described object to behave differently in a tree as follows:
1. The Object identifier contribution for the described object may be switched off.
2. The Object class defines that the described object is able to parent.
3. The Object class defines that the described object is able to accommodate.

As regards accommodation, when an object in a tree has only one child, the child can be accommodated by the parent and the accommodated child can be removed from the tree and the accommodating object adopts the attributes of the accommodated child.

As explained above, this information is stored in the Class Definitions tables 50.

Figure 7:
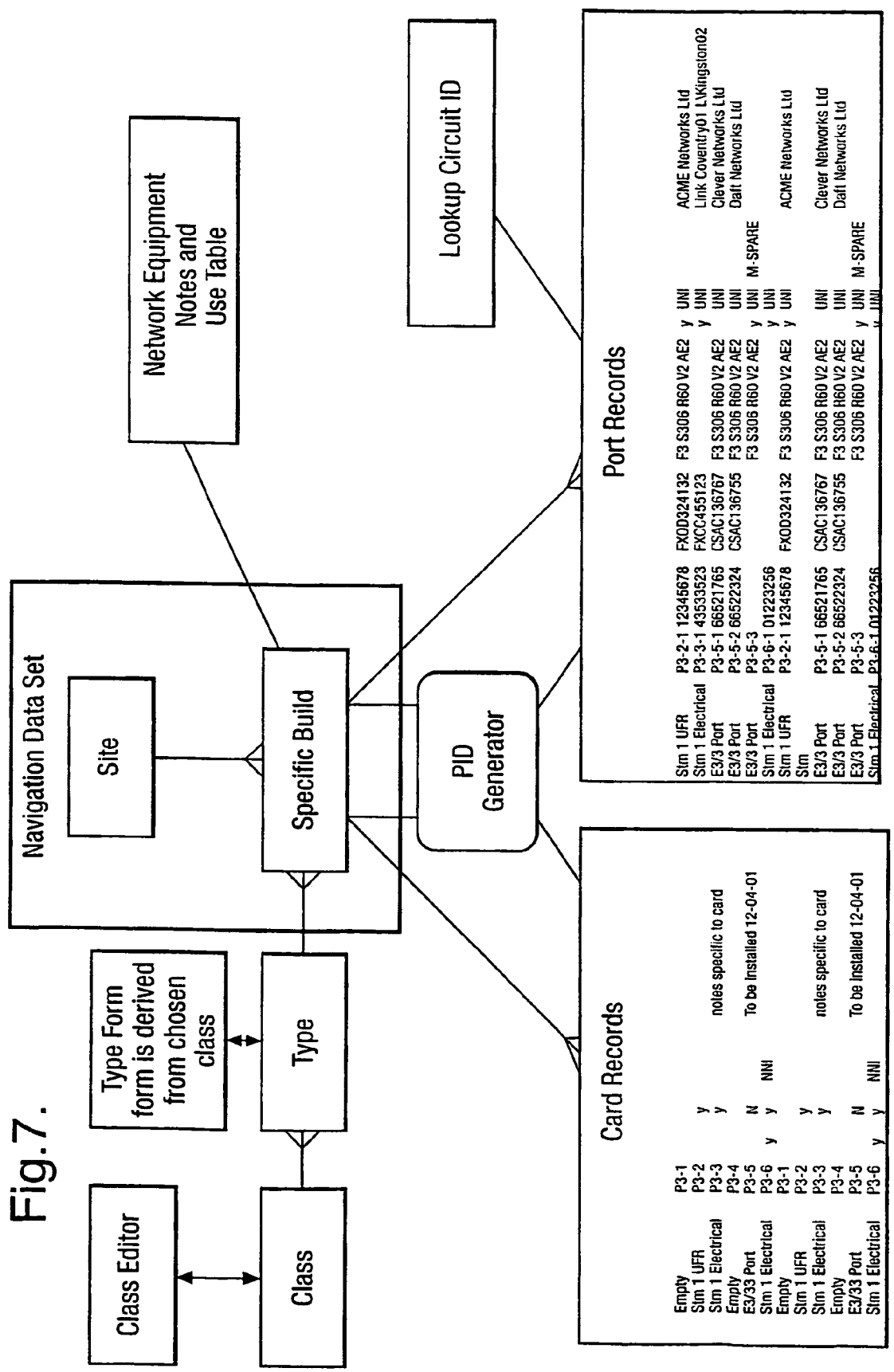
FIG. 7 shows navigation data set mechanisms.

Site attributes are stored in a site table (see FIG. 7). This could define the Coventry site referred to in FIG. 4.

The equipment classes are user defined and are used to control the generic relationships between various network equipment object types as described above.

An example of an equipment class definitions with various attribute possibilities is shown in Table 1.

TABLE 1

Equipment Class Example

| Class | Parent of | May accommodate | PID Value included |
|---|---|---|---|
| Switch | Shelf | Nothing | No |
| Shelf | Shelf Slot | Nothing | Yes |
| Slot | Slot Port | Card | Yes |
| Card | Port Slot | Nothing | No |
| Port | Nothing | Nothing | Yes |

The port identifier (PID) value is not included for either the class switch or card. This is because when created, the PID needs to correspond to the PID from the vendor's report.

Where half shelves are employed, a class for modeling these is required and the attributes shown in Table 2 would be used.

TABLE 2

| Name | Parent | Accommodates | PID |
|---|---|---|---|
| Half Shelf The name of the class | Slot Half shelves will parent only slots | Nothing Half shelves will not contain cards | No The half shelf should not be included in the PID for any card or port |

The port identifier (PID) discussed above is essential in identifying either a port or a slot, the element manager (from the vendor's database) will identify a specific slot or port using the switch name and the PID alone. Hence, for example, P1-2 would locate slot 2 in shelf 1 or P1-5-1 locates port 1 in slot 5 of shelf 1 (see also FIG. 5). Some pieces of network equipment do not add to the PID value (card, for example) and the offsets of the various values of the PID can change depending on the build used. This allows the correct identification of ports or slots to be made.

The port or slot identifier found in a record in a file input from an element manager can be parsed in accordance with user-specified rules to isolate a level index found in the Build Template for the appropriate switch.

The relationships between equipment class type, equipment type, site and specific build are shown in FIG. 7.

Having defined all the equipment types required then a switch 'Build Template' may be built.

An example of a created switch 'Build Template' using the previously defined equipment types will follow the format shown in Table 3.

TABLE 3

| Attribute | Example | | | |
|---|---|---|---|---|
| Site | Any town | | | |
| Class | Switch | | | |
| Type | | | | |
| Name | Any town 01 | | | |
| Alt Name | 01234 | | | |
| Site Code | AT/01 | | | |
| Address | | | | |
| Access Fill % | 80% | | | |
| UNI/NNI Ratio | 50% | | | |
| Floor | G | | | |
| Suite | 6 | | | |
| Rack | 130 | | | |
| Parent of | | Floor | Suite | Rack |
| | P1 | LG | 12 | 270 |
| | P2 | LG | 12 | 250 |
| | P3 | LG | 12 | 230 |
| | P4 | LG | 12 | 210 |

The values for site, class and type are taken from their definitions. The Name identifies the equipment and appears in the navigation tree. The Alt Name is the five digit number used by the vendor element manager to identify the switch. The preset UNI/NNI ratio and the Access Fill are entered as shown. Floor to Rack is concerned with location of the switch fabric. The columns relate to information chosen from the class shelf. As the switch class is defined as 'parent of shelf' then only shelf types will be altered. The Alt Name and Address fields will be empty at the time of creation of the planned switch process. All attributes from this point cascade down the tree to the ports.

As shown in the display of FIG. 4, the navigational view using an object tree approach gives rapid and clear information on the site information and switch build. The mechanisms associated with the navigation data set are shown in FIG. 7.

As discussed above, the inventory is built using hierarchically indexed data in the generic tree form. The navigation through the network includes network site and the components within that site. Hence, as shown in FIG. 7, the class is created under the control of editor with the three attributes set by the rules and these variable classes are then attributed types. In other words, each type will always be in a class (e.g. slot or card) generic to the network equipment that may be used by an operator. The variable type is selected for the specific build to identify the actual component within the context of their location and use.

NEAT enables the system operators to create a database which can reflect the format of any vendor's element manager output thereby enabling the population and comparison of data within the database with the element manager data.

Due to the flexibility of the tree many element manager data formats may be represented thereby allowing NEAT to support multiple equipment makes and types.

Empty slots may be populated with planned data which may be simultaneously available to a number of planners in various locations within an operator's business.

As records may be identified as either 'in service' or 'planned', then output to other operation, service and support tools (OSS) may include either in service and planned or in service or planned.

For the card records and port records illustrated in FIG. 7 (which constitute the flat files from the vendor's element management database) these are indexed by using the port identifier (PID) generator to allow the navigation data set to be built. The data stored can be accompanied by notes to enhance the representation of the system.

Customer circuit ID will be concerned with customer details in the lookup circuit ID.

Hence the graphical representation displayed is the navigational view of the object oriented database in relation to the relevant object, used to represent the state of the database or the data contained within the database and as shown in FIG. 4 includes visual indicia in the form of an indicator or gauge via the display generator.

The indicator will change colour and/or shape to indicate that a threshold set within the range of the gauge has been reached, exceeded or has fallen below the threshold.

At least four values are required which may be either operator defined or derived from values or results of calculations performed on one or more values within the database and may include operator defined data.

The four values required to generate the gauge or indicator are:

RANGE (the extent of the indicator)
VALUE (the current value of the indicator)
THRESHOLD (the value used to trigger a change in the display of the indicator or gauge when the current value either equals, exceeds or does not exceed the THRESHOLD value, the behaviour can be defined by a user) additional THRESHOLDS can be used to activate different animations of the gauge or indicator display (e.g. green, amber, red)
SCALE (the granularity of the indicator).

The resultant display from the example below will be visible to the user in the context of the navigation tree view of FIG. 4, display 27.

METHOD EXAMPLES

Where Result=INTEGER((CURRENT VALUE/RANGE)*SCALE)

Alarm if CURRENT VALUE>=THRESHOLD (Note, in some instances the alarm may be true if CURRENT VALUE<=THRESHOLD).

The display is constructed using the same number of image parts or a multiple of SCALE and some coloured or changed to represent the CURRENT VALUE based on the value in Result.

Figures 8, 10:
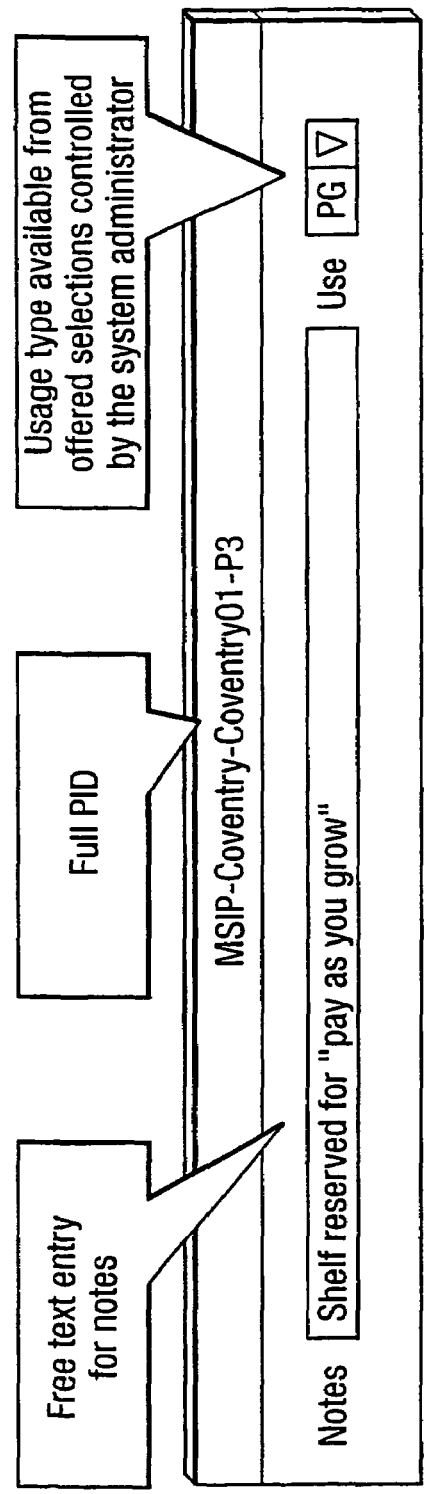
FIG. 8 shows display indicia with associated values.
FIG. 10 shows a portion of the graphical display interface to allow entry of usage type values.

Examples of typical values and resultant display is shown in FIG. 8.

The displays shown on the right column show a scale with either 10 or 15 segments. The result (using the formula) will, in the first display instance, cause 5 segments to be darkened. Other combinations are illustrated including alarm function.

In addition to the tree view, a list view can be provided to produce a one line record for every instance of the level below the current navigation level. Hence, if the navigational view selected is at shelf level, the list display will show the list of cards.

Hence, in the tree view of FIG. 4, the list view relate to the slots and will be as shown in FIG. 9. Both the tree and list view can be viewed simultaneously on the display, if required. Under mouse control by double-clicking on the screen, the display can show the next level both for tree and list view as appropriate. Hence, selecting the slot information of FIG. 9 will produce port information for display.

The list view can be set to show all ports from the point selected in the navigational tree view and below.

The expansion or collapsing of the views is therefore possible to provide the degree of information required with availability shown in the tree view by the bar display.

Table 4 shows the hierarchy based on the switch used in the example described.

TABLE 4

| Level | Description | List View (Selecting either note or use will open notes/use dialog) |
|---|---|---|
| Platform | This is the root of the tree | None |
| Site | This is the name of the site which is taken from the Site Details Form | Site code, Notes |
| Switch | This is the name of the switch which is taken from the specific equipment form for the switch | Site code, PNNI Address, Use Notes |
| Shelf | This will show the PID value from the specific equipment form | Notes Use |
| Sub Shelf or Slot | On some equipment there may be a slot or a card at this level | Notes Use |
| Slot | The slot accommodates Cards and the attributes of the card will create the lower branches of the tree. The PID value | Slot list view (see FIG. 9) |

TABLE 4-continued

| Level | Description | List View (Selecting either note or use will open notes/use dialog) |
|---|---|---|
| | of the Slot will be displayed | |
| Port | This will show the PID value for the slot | Port list view |

The Notes/Use dialog will be available to Planner/Builders and Allocation Administrators. As shown in FIG. 10, the usage type value is settable by the system administrator from a selected on-screen display.

Additional screen views allow access to the data within the database.

The graphical user interface (GUI) could be accessible remotely in the network (or web-based) and the database and other components can be constructed using ORACLE system software.

Figure 11:
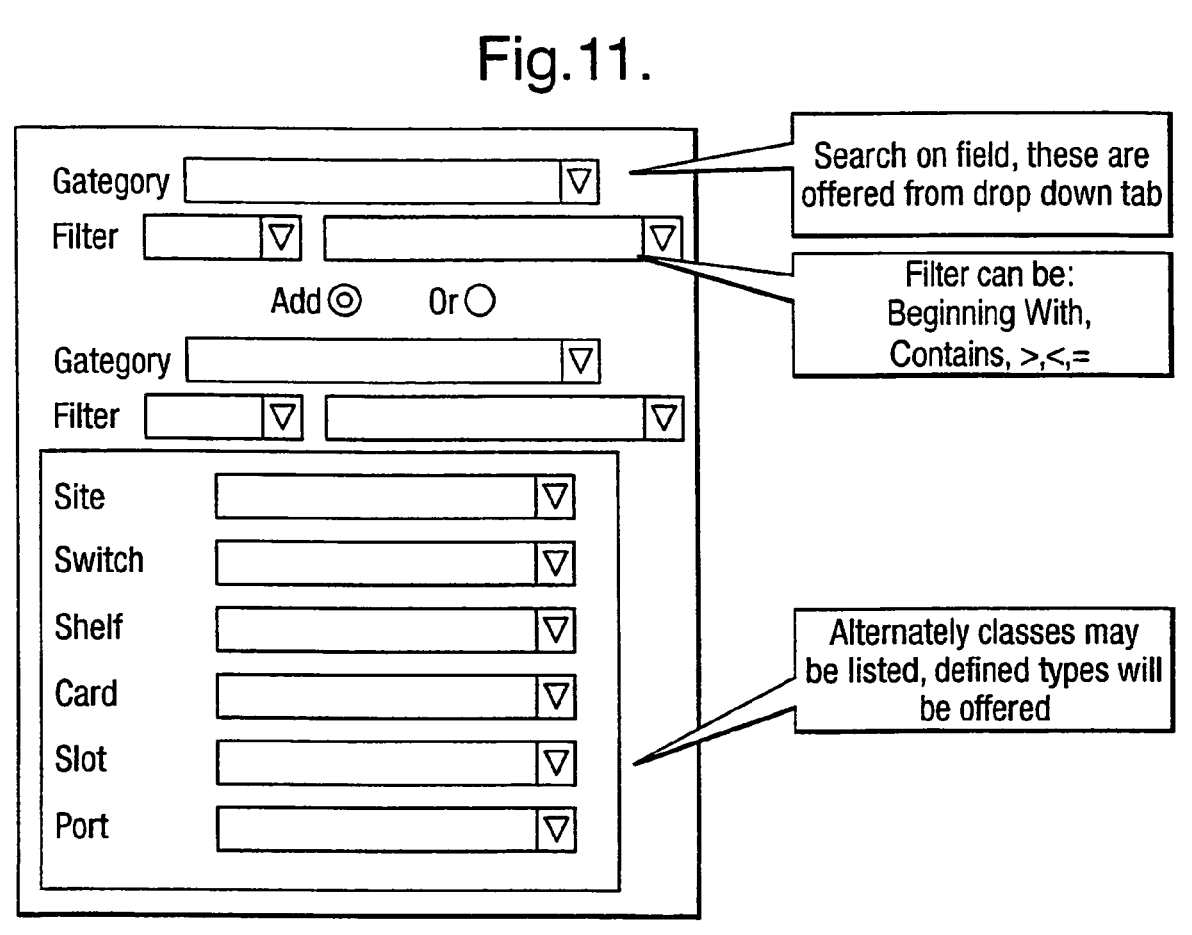

FIG. 11 shows the screen view associated with a comprehensive search facility to enable administrators to search both the card records and the port (Link End) records data, which will be displayed as a list view. The output would also be printed or saved to file in a comma separated variable length text file format (CSV format).

FIG. 12 shows the screen view associated with selection of either a slot record or a port record. Users can edit the port allocation or change the cards in the slot in this view.

As some cards support a number of ports, if a card is changed, the display will generate a warning to the user so that they will be aware of the possibility of losing all port information. Any allocations made will carry identification information regarding user name and allocation date.

Allocations will carry an expire date and will be preset, typically for a three month period. This allows allocations to be removed automatically if not used by the expire date to free up network space.

It will also be possible to view links by selecting the circuit ID. As this is the same as both ends of the link, the port details will be listed for both ends. An example of typical link details generated is shown in Table 5. Here the link is between Coventry switch 1 and Kingston switch 2.

TABLE 5

Link Details for FXCC455123

| Card | Port | Alloc-Alloc Notes | Circuit ID | I | F | Type | Reserved | Link Notes |
|---|---|---|---|---|---|---|---|---|
| Platform-Coventry-Coventry01 | | | | | | | | |
| Stm 1 Electrical Coventry01\Kingston02 | P3-3-1 | 43522 | FXCC455123 | Y | | | NNI | Link |
| Platform-L\Kingston-1\Kingston02 | | | | | | | | |
| Stm 1 Electrical L\Kingston02 Coventry01 | P6-2-1 | 43523 | FXCC455123 | Y | | | NNI | Link |

Figure 13:
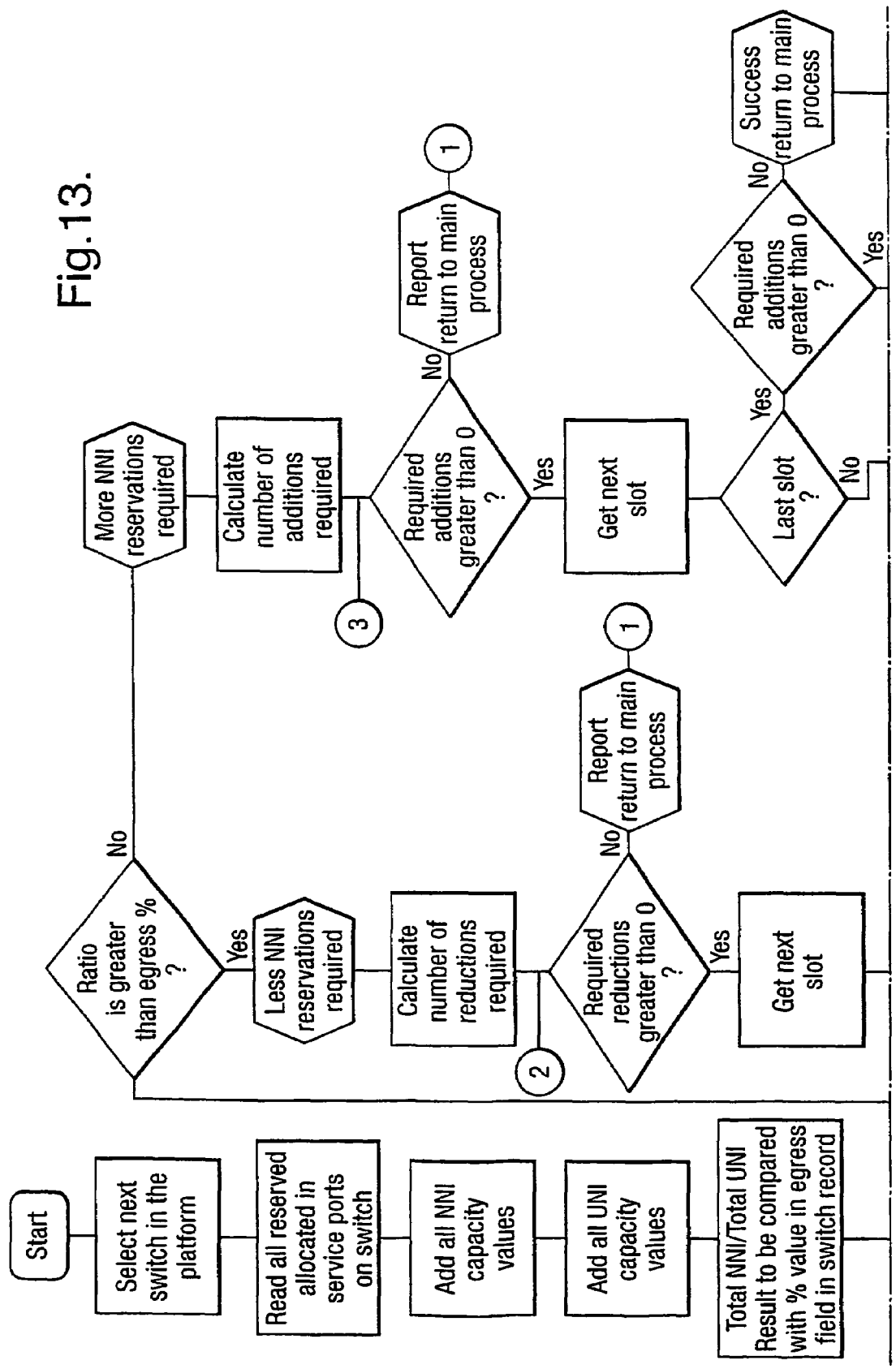
FIG. 13 shows a flowchart concerned with network allocation and reservation.
Figure 13:
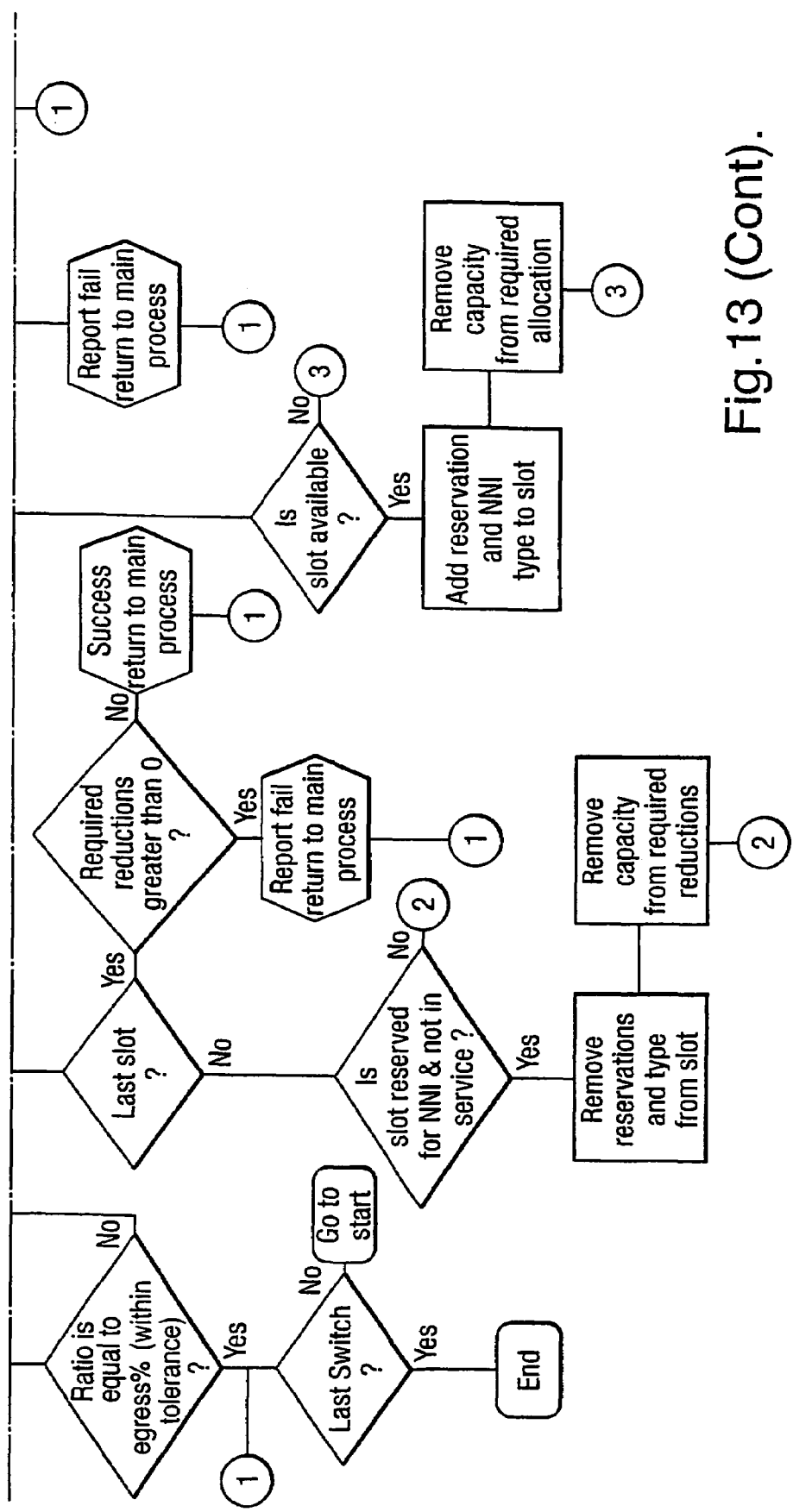

FIG. 13 shows a flowchart showing the process employed concerned with verifying and, if necessary, adjusting NNI reservations of network switches.

It takes manually updated values from a switch or a value from the forecasting tool. Based on values stored for each switch, it will reserve or remove reservations of capacity on the switch where possible for egress purposes (NNI). This mechanism prevents manual overallocation of access.

It will be seen how the above embodiment provides a network operator with a view of network inventory which may go beyond the information provided directly in the flat files from the element manager. For example, a network operator may wish to see the level of utilisation of a half-shelf of a switch when the flat file from the element manager does not distinguish between the half-shelves of a shelf. By defining a first half-shelf to include slots 1 to 6 in the Build Template, the level of usage for the half-shelf can be calculated from the data provided in the flat file for slots 1 to 6.

Although the inventory system has been described in terms of a telecommunications network environment, the modified tree approach has applications in other databases where flat file information needs to be converted into a hierarchically indexed database. Also, as mentioned above, more than one object identifier can be employed in construction of the database.

A non-network inventory could be constructed for use with ISBN publications for example. In this case depending on whether the searcher was looking for content, publisher or media, for example, then different tree representations could be generated using the method described above.

What is claimed is:

1. A method of loading disparate sets of records into a database stored in a storage medium, said method comprising:
    storing data in said storage medium listing a set of levels to be included in a generic containment hierarchy, wherein a record in said database is referenced by a full multi-level index comprising a level value for each level in said generic containment hierarchy;
    receiving a set of records, each record including an abbreviated multi-level index comprising a set of level values, for a corresponding set of levels included in a specific containment hierarchy whose levels form a subset of said generic containment hierarchy; and
    for each of said records, inserting values for each level present in said generic containment hierarchy but absent from said specific containment hierarchy in between consecutive values of said abbreviated multi-level index to generate a full multi-level index to said record.

2. The method as in claim 1 wherein said inserting step comprises:
    storing data associating one or more level values in said abbreviated multi-level index with one or more level values for insertion at an immediately higher level in said generic hierarchy.

3. The method as in claim 2 wherein said data is stored in the form of a specific hierarchy.

4. The method as in claim 2 further comprising the step of storing one or more further sets of records representing further containment hierarchies.

5. The method as in claim 1 wherein said full multi-level index represents a hierarchy of containers in an inventory database.

6. The method as in claim 5 wherein said inventory database represents the inventory of a telecommunications network operator.

7. A database system with contents representing a communications network, said database system comprising:
    a first element manager arranged in operation to output a first file comprising records labeled in accordance with a first specific containment hierarchy;
    a computer system storing a network inventory database;
    means providing communication between said element managers and said computer system;
    software stored on said computer system configured to integrate records from said first files into said network inventory database by:
        storing data listing a set of levels to be included in a generic containment hierarchy, wherein a record in said database is referenced by a full multi-level index comprising a level value for each level in said generic containment hierarchy;
        receiving records from said first file, each record including an abbreviated multi-level index comprising a set of level values for a corresponding first set of levels included in said first specific containment hierarchy whose levels form a subset of said generic containment hierarchy; and
        for each of said records from said first file, inserting values for each level present in said generic containment hierarchy but absent from said first specific containment hierarchy in between consecutive values of said abbreviated multi-level index to generate a full multi-level index to said record.

8. The database system as in claim 7 further comprising:
    a second element manager arranged in operation to output a second file comprising records labeled in accordance with a second specific containment hierarchy sharing at least one level with said first specific containment hierarchy, said software stored on said computer being further configured to implement a method comprising:
        receiving records from said second file, each record including an abbreviated multi-level index comprising a set of level values for a corresponding second set of levels included in said second specific containment hierarchy whose levels form a subset of said generic containment hierarchy; and
        for each of said records from said second file, inserting values for each level present in said generic containment hierarchy but absent from said second specific containment hierarchy in between consecutive values of said abbreviated multi-level index to generate a full multi-level index to said record.

* * * * *